United States Patent
Newman et al.

[19]

[11] Patent Number: 6,151,575
[45] Date of Patent: *Nov. 21, 2000

[54] RAPID ADAPTATION OF SPEECH MODELS

[75] Inventors: Michael Jack Newman, Somerville; Laurence S. Gillick, Newton; Venkatesh Nagesha, Waltham, all of Mass.

[73] Assignee: Dragon Systems, Inc., Newton, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,957

[22] Filed: Oct. 28, 1997

Related U.S. Application Data

[60] Provisional application No. 60/029,828, Oct. 28, 1996, and provisional application No. 60/039,571, Feb. 28, 1997.

[51] Int. Cl.$^7$ ..................................................... G10L 13/00
[52] U.S. Cl. ..................... 704/260; 704/231; 704/236; 704/239; 704/240; 704/247; 704/254; 704/255
[58] Field of Search ..................................... 704/231, 236, 704/239, 240, 247, 254, 255

[56] References Cited

U.S. PATENT DOCUMENTS

| | | |
|---|---|---|
| 4,759,068 | 7/1988 | Bahl et al. . |
| 4,805,218 | 2/1989 | Bamberg et al. . |
| 4,805,219 | 2/1989 | Baker et al. . |
| 4,817,156 | 3/1989 | Bahl et al. . |
| 4,817,158 | 3/1989 | Picheny . |
| 4,817,161 | 3/1989 | Kaneko . |
| 4,819,271 | 4/1989 | Bahl et al. . |
| 4,827,521 | 5/1989 | Bahl et al. . |
| 4,829,576 | 5/1989 | Porter . |
| 4,829,577 | 5/1989 | Kuroda et al. . |
| 4,831,550 | 5/1989 | Katz . |
| 4,833,712 | 5/1989 | Bahl et al. . |
| 4,837,831 | 6/1989 | Gillick et al. . |
| 4,876,720 | 10/1989 | Kaneko et al. . |
| 4,882,759 | 11/1989 | Bahl et al. . |
| 4,903,305 | 2/1990 | Gillick et al. . |
| 4,914,703 | 4/1990 | Gillick . |
| 4,926,488 | 5/1990 | Nadas et al. . |
| 4,931,950 | 6/1990 | Isle et al. . |
| 4,972,485 | 11/1990 | Dautrich et al. . |
| 4,980,918 | 12/1990 | Bahl et al. . |
| 5,027,406 | 6/1991 | Roberts et al. . |
| 5,031,217 | 7/1991 | Nishimura . |
| 5,033,087 | 7/1991 | Bahl et al. . |
| 5,036,538 | 7/1991 | Oken et al. . |

(List continued on next page.)

FOREIGN PATENT DOCUMENTS

| | | |
|---|---|---|
| 0238693 | 9/1987 | European Pat. Off. . |
| 0562138 | 9/1993 | European Pat. Off. . |

OTHER PUBLICATIONS

Asadi, Ayman, "Automatic Modeling for Adding New Words to a Large Vocabulary", ICASSP 91, vol. 1 (1991), pp. 305–308.

Bahl, Lalit, "A Maximum Likelihood Approach to Continuous Speech Recognition," IEEE Transactions on Pattern Analysis and Machine Intelligence, vol. PAMI–5, No. 2 (Mar. 1983), pp. 179–190.

Bahl, L.R., "Adaptation of Large Vocabulary Recognition System," ICASSP–92, vol. 1 (Mar. 1992), pp. 1477–1480.

(List continued on next page.)

*Primary Examiner*—Krista Zele
*Assistant Examiner*—Michael N. Opsasnick
*Attorney, Agent, or Firm*—Fish & Richardson P.C.

[57] ABSTRACT

A source-adapted model for use in speech recognition is generated by defining a linear relationship between a first element of an initial model and a first element of the source-adapted model. Thereafter, speech data that corresponds to the first element of the initial model is assembled from a set of speech data for a particular source associated with the source-adapted model. A linear transform that maps between the assembled speech data and the first element of the initial model is then determined. Finally, a first element of the source-adapted model is produced from the first element of the initial model using the linear transform.

25 Claims, 7 Drawing Sheets

U.S. PATENT DOCUMENTS

| | | |
|---|---|---|
| 5,046,099 | 9/1991 | Nishimura . |
| 5,050,215 | 9/1991 | Nishimura . |
| 5,054,074 | 10/1991 | Bakis . |
| 5,054,085 | 10/1991 | Meisel et al. . |
| 5,072,452 | 12/1991 | Brown et al. . |
| 5,127,055 | 6/1992 | Larkey . |
| 5,129,001 | 7/1992 | Bahl et al. . |
| 5,170,432 | 12/1992 | Hackbarth et al. . |
| 5,182,773 | 1/1993 | Bahl et al. . |
| 5,202,952 | 4/1993 | Gillick et al. . |
| 5,276,766 | 1/1994 | Bahl et al. . |
| 5,278,942 | 1/1994 | Bahl et al. . |
| 5,280,562 | 1/1994 | Bahl et al. . |
| 5,280,563 | 1/1994 | Ganong . |
| 5,293,451 | 3/1994 | Brown et al. . |
| 5,428,707 | 6/1995 | Gould et al. . |
| 5,440,663 | 8/1995 | Moese et al. . |
| 5,467,425 | 11/1995 | Lau et al. . |
| 5,497,447 | 3/1996 | Bahl et al. . |
| 5,623,578 | 4/1997 | Mikkilineni . |
| 5,710,864 | 1/1998 | Juang et al. . |
| 5,715,367 | 2/1998 | Gillick et al. . |
| 5,793,891 | 8/1998 | Takahashi et al. ............... 704/231 |
| 5,864,810 | 1/1999 | Digalakis et al. ............... 704/255 |

OTHER PUBLICATIONS

Bahl, L.R., "Automatic Selection of Speech Prototypes," IBM Technical Disclosure Bulletin, vol. 24, No. 4 (Sep. 1981), pp. 2042–2043.

Bahl, L.R., "Automatic High–Resolution Labeling of Speech Waveforms," IBM Technical Disclosure Bulletin, vol. 23, No. 7B (Dec. 1980), pp. 3466–3467.

Bahl, L.R. et al., "Constructing Groups of Acoustically Confusable Words," IEEE (1990), pp. 85–88.

Bamberg, Paul G. et al., "Adaptation Performance in a Large–Vocabulary Recognizer," Dragon Systems, Inc., Newton, MA, pp. 1–7.

Fissore, Luciano et al., "Lexical Access to Large Vocabularies For Speech Recognition," IEEE Transactions on Acoustics, Speech, and Signal Processing, vol. 37, No. 8 (Aug. 1989), pp. 1197–1213.

Gillick, Larry et al., "Rapid Match Training For Large Vocabularies," Dragon Systems, Inc., Newton, MA.

Haeb–Unbach, R., "Automatic Transcription of Unknown Words in a Speech Recognition System," The 1995 International Conference on Acoustics, Speech, and Signal Processing, vol. 1 (May 1995), pp. 840–843.

Imai, Toru. "A New Method for Automatic Generation of Speaker–Dependent Phonological Rules," The 1995 International Conference on Acoustics, Speech, and Signal Processing, vol. 1 (May 1995), pp. 864–867.

Mandel, Mark A. et al., "A Commercial Large–Vocabulary Discrete Speech Recognition System: DragonDictate," Language and Speech, vol. 35 (1, 2) (1992), pp. 237–246.

RAPID ADAPTATION OF SPEECH MODELS

CROSS REFERENCE TO RELATED APPLICATIONS

This application claims priority from U.S. Provisional Application No. 60/029,828, filed Oct. 28, 1996, and U.S. Provisional Application No. 60/039,571, filed Feb. 28, 1997.

BACKGROUND

The invention relates to speech recognition.

A speech recognition system analyzes a person's speech to determine what the person said. Most speech recognition systems are frame-based. In a frame-based system, a processor divides a signal descriptive of the speech to be recognized into a series of digital frames, each of which corresponds to a small time increment of the speech. The processor then compares the digital frames to a set of speech models. Each speech model may represent a word from a vocabulary of words, and may represent how that word is spoken by a variety of speakers. A speech model also may represent a sound, or phoneme, that corresponds to a portion of a word. Collectively, the constituent phonemes for a word represent the phonetic spelling of the word.

The processor determines what the speaker said by finding the speech models that best match the digital frames that represent the person's speech. The words or phrases corresponding to the best matching speech models are referred to as recognition candidates. The processor may produce a single recognition candidate for each utterance, or may produce a list of recognition candidates. Speech recognition is discussed in U.S. Pat. No. 4,805,218, entitled "METHOD FOR SPEECH ANALYSIS AND SPEECH RECOGNITION," which is incorporated by reference.

A speech recognition system may be a "discrete" system—i.e., one which recognizes discrete words or phrases but which requires the speaker to pause briefly between each discrete word or phrase. Alternatively, a speech recognition system may be "continuous" meaning that the recognition software can recognize spoken words or phrases regardless of whether the speaker pauses between them. Continuous speech recognition systems typically have a higher incidence of recognition errors in comparison to discrete recognition systems due to complexities of recognizing continuous speech. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

Speech models that represent the speech of a large group of speakers are referred to as speaker independent models. In general, the performance of a speech recognition system may be improved by adapting the speech models according to the speech of a particular speaker who is using the system. These adapted speech models are referred to as speaker-adapted models. A speaker-adapted model may be produced by adapting a speaker-independent model, also referred to as a speaker-adaptable model, based on speech material, referred to as adaptation data, acquired from the speaker associated with the speaker-adapted model. This process of producing a speaker-adapted model may be referred to as speaker adaptation. The speaker-adaptable model also may be improved by modifying the model using adaptation data for a group of speakers.

One method of speaker adaptation is to update the model parameters of a speech unit (e.g., a word or a phoneme) every time that the speaker utters the speech unit. This method may be referred to as a Bayesian or maximum a posteriori (MAP) method and can be interpreted as a way of combining a priori information (i.e., a speaker-independent model) with observed data (i.e., the adaptation data).

In one known approach to generating a speaker-independent model, speech data from multiple speakers are combined to form the speaker-independent model. In general, each unit of the model represents a phoneme in a particular context, different units model a phoneme in different contexts or different phonemes. To ensure that the speaker-independent model is of reasonable size, multiple contexts for one or more phonemes or parts of phoneme are represented by a single model. In particular, each phoneme/context pair is represented by a small number of nodes (e.g., three) mapping is generated between a set of all nodes for all phoneme/context pairs to a set of node models, where most, if not all, node models represent a large number of phoneme/context pairs. The mapping may be referred to as a decision tree, and a particular node model may be represented as a collection of Gaussian distributions that each include a mean component and a variance component. The speaker-independent model may be generated or refined by modifying the means and variances of the Gaussian distributions to conform to speaker data.

SUMMARY

In one general aspect, the invention features generating a source-adapted model for use in speech recognition. A collection of elements is generated from an initial model, and source speech data that corresponds to elements in the collection of elements is assembled from a set of source speech data for a particular source associated with the source-adapted model. A linear transform that maps between the assembled source speech data and the collection of elements of the initial model then is determined by determining a relationship between each element of the initial model in the collection and a portion of the assembled source speech data that corresponds to that element. Finally, elements of the source-adapted model are produced from corresponding elements of the initial model by applying the linear transform to the elements of the initial model.

Sources of speech data include particular speakers or groups of related speakers. Examples of related groups of speakers include speakers of the same gender, speakers from the same geographic region (e.g., New England or the Southern United States), or speakers of different ages. Speaker groupings may be designated by a human operator or by automatic partitioning techniques.

By generating a transform using data associated with a collection of elements (e.g., phoneme nodes, mixture components, or other speech units) and using the transform to adapt a speech model for each speech unit within the collection, the technique leverages adaptation data associated with multiple speech units. This permits effective source adaptation to be achieved even when there is little or no adaptation data for a particular speech unit. Stated another way, effective source adaptation may be achieved using a relatively small amount of adaptation data. By contrast, Bayesian or MAP approaches require relatively large amounts of adaptation data so as to cover the entire collection of speech units and to obtain reasonable estimates of the model parameters for each speech unit.

Embodiments may include one or more of the following features. The collection of elements may be associated with similarly-sounding speech units, may have similar values, or both. Elements to be included in the collection of elements may be identified by a human operator or an automatic procedure. For example, the human operator may identify elements as having similarly-sounding speech units. In a hybrid, human-assisted technique for generating collections, a human operator identifies classes of elements having similarly-sounding speech units and the collection is generated using an automatic procedure that employs the identified classes and similarities between elements. For example, the human operator may identify classes of related elements and the collection of elements may be generated using an automatic procedure that favors including elements from a common class in the collection and penalizes including elements from different classes in the collection.

Statistics may be generated from the assembled source speech data and used in determining the linear transform based on the generated statistics. For example, an average value of the assembled source speech data for a particular element or a count of speech frames associated with the assembled source speech data for the particular element may be determined.

A smoothing factor that accounts for an amount of source speech data available for a particular element may be used in generating the statistics. For example, an average value of the assembled source speech data for a particular element may be modified based on the smoothing factor and a value for the element from the initial model.

When each element of the initial model includes a mean portion and a variance portion, an element of the source-adapted model may be produced from a corresponding element of the initial model by applying the linear transform to the mean portion of the element of the initial model and leaving the variance portion unchanged.

In another general aspect, the invention features generating a source-adapted model for use in speech recognition. A collection of elements is generated from an initial model, and speech data that corresponds to elements in the collection of elements is assembled from a set of speech data for a particular source associated with the source-adapted model. Statistics then are generated from the assembled source speech data using a smoothing factor that accounts for an amount of source speech data available for a particular element. These statistics are used in determining a linear transform that maps between the assembled speech data and the collection of elements of the initial model. Finally, elements of the source-adapted model are produced from corresponding elements of the initial model by applying the linear transform to the elements of the initial model.

In addition to creating source-adapted models, the techniques of the invention may be used in training a speech model such as a source-independent model. Typically, source-independent models are trained using training data from a large number of sources, without regard to the particular source used in the training. The transformation techniques of the invention may be used to reduce the effects of superfluous, source-specific variations in the training data. For example, an inverse of the transformation used to produce the source-adapted model for a particular source may be used to reduce or eliminate source-induced variations in the training data from that source.

In this regard, and in another general aspect, the invention features training a source-independent speech model for use in speech recognition. Sets of speech data that corresponds to elements of an initial model are assembled from a set of speech data for one or more sources and representative values for each set of speech data are calculated. Next, relationships between the representative values of the assembled speech data and values of the corresponding elements of the initial model are determined. Different relationships are permitted so that a relationship for a first set of speech data may differ from a relationship for a second set of speech data. These relationships are used to modify each item of the sets of speech data. Finally, elements of the source-independent speech model are generated using the modified sets of speech data.

This technique provides tremendous flexibility in that it may be used to generate a source-independent speech model having a structure or size that differs from the initial model. For example, a relatively small source-independent speech model may be generated from a relatively large initial model. Thus, a number of elements of the initial model may be substantially larger than a number of elements of the speech model. Other ways in which the structure of the models may vary is in the number of phonemes included in the models, the number of nodes per phoneme, the number of output PDFs per node, and the number of mixture components.

An advantage of this approach is that it permits the creation of a relatively small source-independent model that takes advantage of all available source data. In initial model for which a relatively small number of phoneme/context pairs maps to each node model is used to back transform the source data (i.e., to remove source idiosyncracies). The transformed source data then is used in producing a smaller source-independent speech model for which a relatively large number of phoneme/context pairs maps to each node model. Use of larger initial models are needed due to large variability in the training data; the removal of spurious variability by modifying each speaker's training data allows the use of smaller final models. The use of smaller final models reduces recognition time and memory usage, both of which are important in designing effective, practical speech recognition systems.

As noted above, relationships may differ for different elements of the model, even for a single source. When sets of speech data that correspond to elements of the initial model are assembled for speech data from different sources, relationships for the same element may differ for different sources. The element of the speech model is generated using modified sets of speech data from different sources.

The relationships may be linear transformations. In particular, a relationship may be determined by determining a transform that maps between the set of speech data and the element of the initial model, and generating an inverse of the transform. Each element of the set of speech data is modified by applying the inverse of the transform to each element of the set of speech data.

In yet another general aspect, the invention features training a speech model for use in speech recognition by assembling speech data that corresponds to a first element of the speech model from a set of speech data for a first source, determining a transform that maps between the assembled speech data and the first element of the speech model, and generating an inverse of the transform. The first element of the speech model is updated, or retrained, using the assembled speech data and the inverse of the transform.

Training of the speech model may further include assembling speech data that corresponds to the first element of the speech model from a set of speech data for a second source, determining a second transform that maps between the assembled speech data for the second source and the first element of the speech model, and generating an inverse of the second transform. The first element of the speech model is updated using the assembled speech data for the first and second sources and the inverses of the first and second transforms.

Instead of modifying the speech model, the transform also may be used to modify the training data. In this regard, and in another aspect, generally, the invention features determining a difference for each component and then determining a correction factor for each frame as a weighted average of the above differences, and modifying the speech data using the determined correction factor. The entire acoustic model may be updated using the modified speech data according to desired size and/or structure.

The techniques of the invention may be implemented in computer hardware or software, or a combination of the two. However, the techniques are not limited to any particular hardware or software configuration; they may find applicability in any computing or processing environment that may be used for speech recognition. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION

Figure 1:
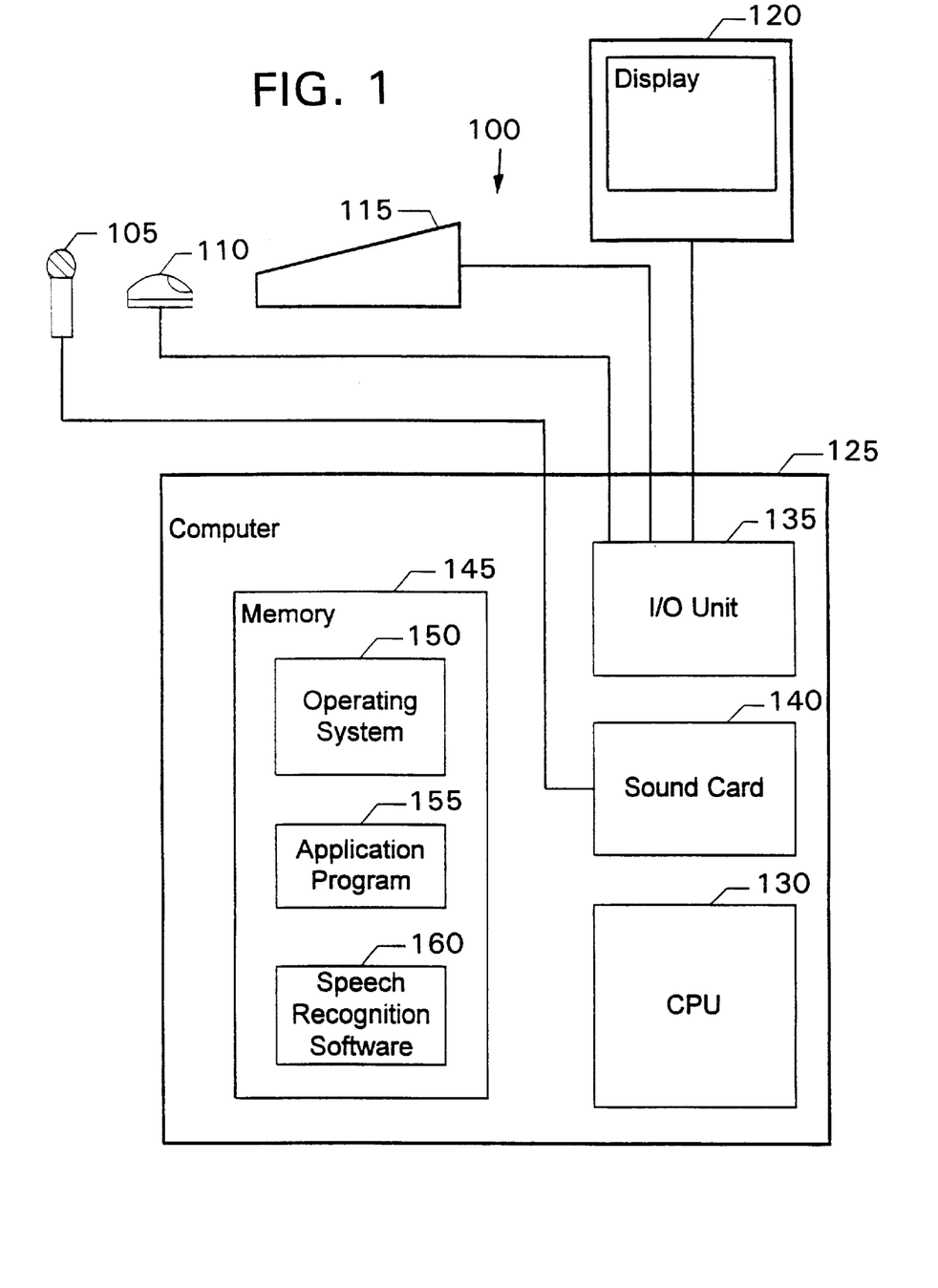
FIG. 1 is a block diagram of a speech recognition system.

Referring to FIG. 1, a speech recognition system 100 includes input/output (I/O) devices (e.g., microphone 105, mouse 110, keyboard 115, and display 120) and a general purpose computer 125 having a processor 130, an I/O unit 135 and a sound card 140. A memory 145 stores data and software such as an operating system 150, application software 155 (e.g., a word processing program), and speech recognition software 160.

Figure 2:
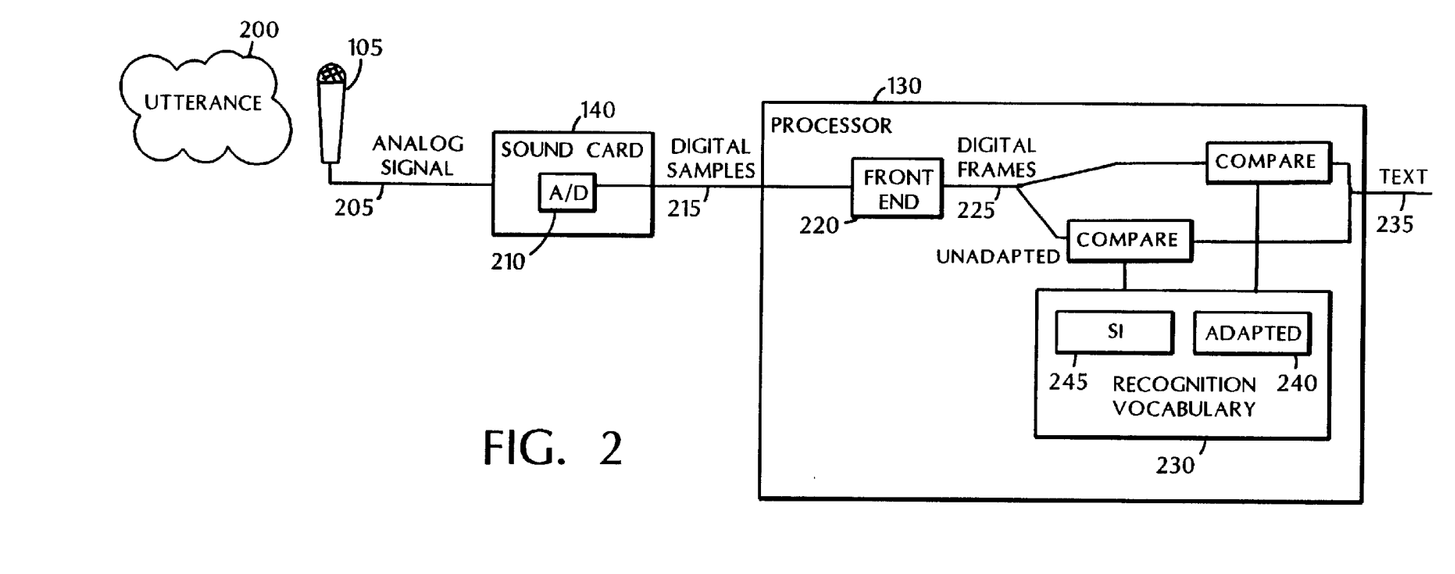
FIG. 2 is a flow diagram of data flow through the speech recognition system of FIG. 1.

Referring also to FIG. 2, the microphone 105 receives an utterance 200 from a speaker and conveys the utterance, in the form of an analog signal 205, to the sound card 140, which in turn passes the signal through an analog-to-digital (A/D) converter 210 to transform the analog signal 205 into a set of digital samples 215. The processor 130 analyzes the digital samples 215 using front end processing software 220 to produce a sequence of frames 225 which represent the frequency content of the utterance. Each frame includes several (e.g., 24) parameters and represents a short portion (e.g., 10 milliseconds) of the utterance.

Figure 3:
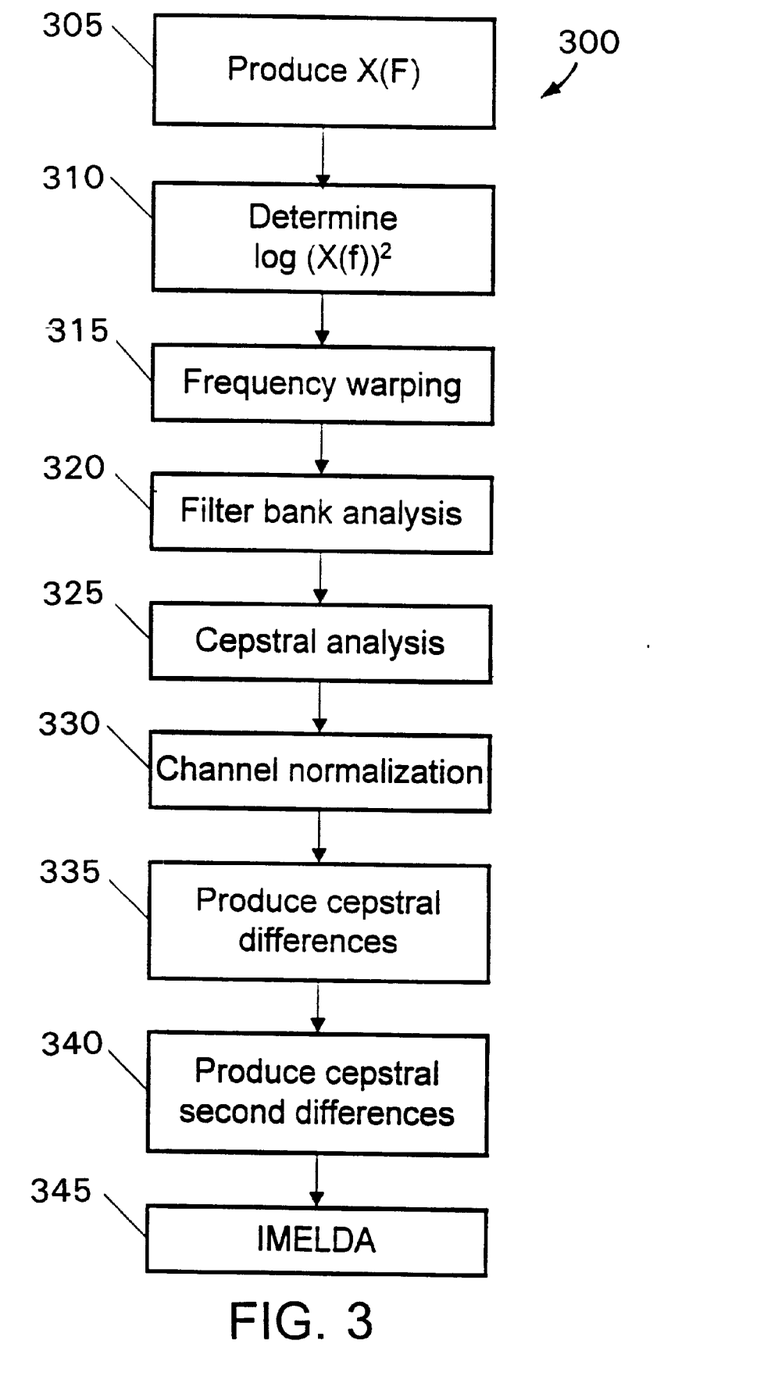
FIG. 3 is a flow chart of a procedure performed by the speech recognition system of FIG. 1.

In one implementation, as shown in FIG. 3, the front end processing software 220 causes the processor 130 to operate according to a procedure 300 to produce a frame from digital samples 215 corresponding to a portion of an utterance to be represented by the frame. First, the processor produces a frequency domain representation $X(f)$ of the portion of the utterance by performing a Fast Fourier Transform (FFT) on the digital samples 215 (step 305). Next, the processor determines $\log(X(f))^2$ (step 310). The processor then performs frequency warping (step 315) and a filter bank analysis (step 320) to achieve speaker normalization. From the normalized results, the processor performs cepstral analysis (step 325) to produces twelve cepstral parameters. The processor generates the cepstral parameters by performing an inverse cosine transformation on the logarithms of the frequency parameters. Cepstral parameters and cepstral differences have been found to emphasize information important to speech recognition more effectively than do the frequency parameters. Next, the processor performs channel normalization of the cepstral parameters (step 330). The processor then produces twelve cepstral differences (i.e., the differences between cepstral parameters in successive frames) (step 335) and twelve cepstral second differences (i.e., the differences between cepstral differences in successive frames) (step 340). Finally, the processor performs an IMELDA linear combination transformation (step 345) to select the twenty four most useful parameters from the twelve cepstral parameters, the twelve cepstral differences, and the twelve cepstral second differences.

Figure 4:
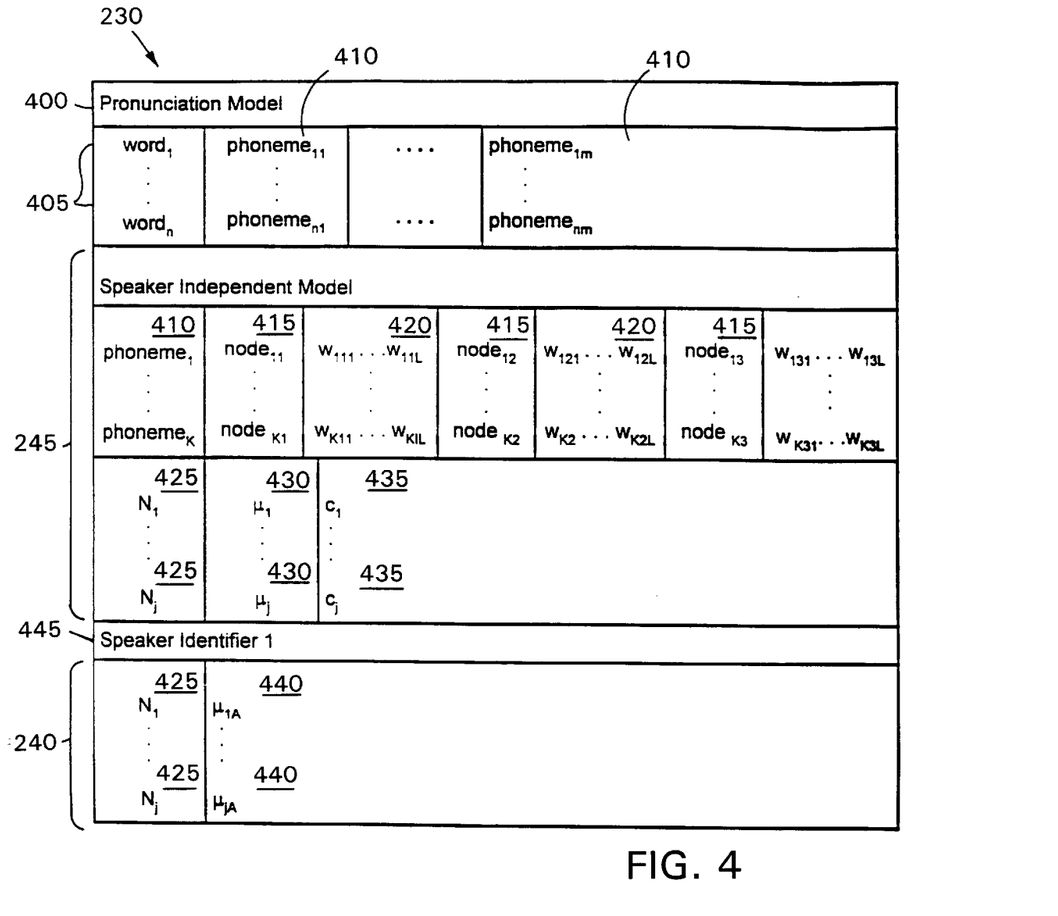
FIG. 4 is a block diagram of a data structure of the speech recognition system of FIG. 1.

Referring again to FIG. 2, the processor 130 compares the sequence of frames 225 to acoustic models from a recognition vocabulary 230 to identify the text 235 that corresponds to the sample. As shown in FIG. 4, the recognition vocabulary 230 uses a pronunciation model in which each word 400 is represented by a series of phonemes 405 (e.g., /ah/, /r/, /d/) that comprise the phonetic spelling of the word. The processor 130 compares the sequence of frames 225 to acoustic models for the phonemes using a dynamic programming technique to identify the series of phonemes, and the corresponding series of words, that best correspond to the sequence of frames. In making the comparison, the processor produces a time alignment that relates each frame of the sequence to a particular phoneme.

If the speech recognition software 160 has been adapted for use with the speaker who produced the utterance, then the processor 130 compares the sequence of frames 225 to adapted acoustic models from a speaker-adapted model 240 in the recognition vocabulary 230. Otherwise, the processor compares the sequence of frames 225 to acoustic models from a speaker-independent speech model 245 (also referred to as a speaker-adaptable speech model) in the recognition vocabulary 230.

As noted above, and as shown in FIG. 4, the recognition vocabulary represents each word 400 using a series of phonemes 405. In one implementation, the speaker-independent speech model 245 represents each phoneme as a triphone 410 that includes three nodes 415. A triphone is a context-dependent phoneme. For example, the triphone "abc" represents the phoneme "b" in the context of the phonemes "a" and "c", with the phoneme "b" being preceded by the phoneme "a" and followed by the phoneme "c".

The speaker-independent model 245 represents each triphone node 415 as a mixture of Gaussian probability density functions ("PDFs"). For example, the speaker-independent model 245 may represent node "i" of a triphone "abc" as $ab^ic$:

$$ab^ic = \sum_k w_k N(\mu_k, c_k),$$

where each $w_k$ is a mixture weight, $$\sum_k w_k = 1,$$

$\mu_k$ is a mean vector for the probability density function ("PDF") $N_k$, and $C_k$ is the covariance matrix for the PDF $N_k$. Like the frames in the sequence of frames 225, the vectors $\mu_k$ each include 24 parameters and the matrices $c_k$ are twenty four by twenty four matrices. Each triphone node may be represented as a mixture of up to, for example, sixteen different PDFs.

A particular PDF may be used in the representation of multiple triphone nodes. Accordingly, the speaker-independent model 245 represents each triphone node 415 as a collection of mixture weights $w_k$ 420 associated with up to sixteen different PDFs $N_k$ and separately represents each PDF $N_k$ 425 using a mean vector $\mu_k$ 430 and a covariance matrix $c_k$ 435. Use of a particular PDF to represent multiple triphone nodes permits the model 245 to include a smaller number of PDFs than would be required if each triphone node included entirely separate PDFs. Since the English language may be roughly represented using 43 different phonemes, there may be up to 79,507 ($43^3$) different triphones, which would result in a huge number of PDFs if each triphone node were represented by a separate set of PDFs. Representing multiple nodes with common PDFs also may remedy or reduce a data sparsity problem that results because some triphones (e.g., "tzp" in the English language) rarely occur. These rare triphones may be represented by having closely-related triphones share the same set of PDFs.

In one implementation, the speaker-adapted model 240 uses the mixture weights $w_k$ 420 and the covariance matrices $c_k$ 435 of the speaker-independent model 245. However, unlike the speaker-independent model 245, the speaker-adapted model 240 uses adapted mean vectors $\mu_{kA}$ 440 that have been adapted for a particular speaker. In other implementations, the speaker-adapted model may use adapted mixture weights and covariance matrices.

Figure 5:
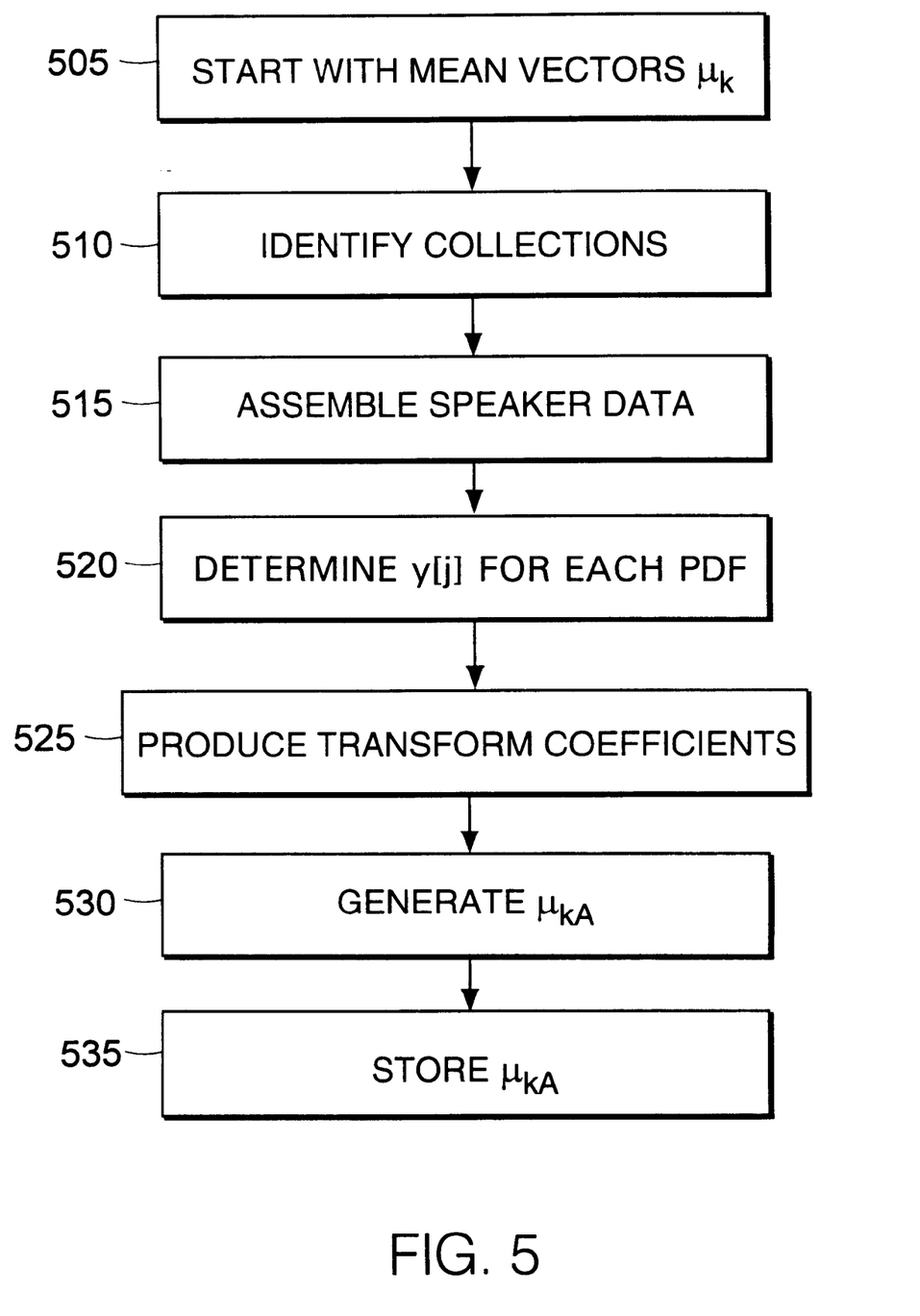
FIGS. 5–7 are flow charts of procedures performed by the speech recognition system of FIG. 1.

Referring to FIG. 5, the adapted mean vectors $\mu_{kA}$ 440 of the speaker-adapted model 240 for a particular speaker are produced according to a procedure 500. Starting with the mean vectors $\mu_k$ 430 of the speaker-independent model 245 (step 505), a transformation-based approach is used to produce the adapted mean vectors $\mu_{kA}$ 440. As noted above, the covariance matrices $c_k$ 435 are not adapted. The transformation-based approach assumes that an adapted mean vector $\mu_{kA}$ may be expressed as:

$$\mu_{kA} = A_j \mu_k + b_j$$

where A and b are transforms. When each mean vector has twenty four entries, A is a twenty four by twenty four matrix and b has twenty four entries.

Next, collections of PDFs that are expected to share a common transformation are determined (step 510). A collection C could include the PDFs representing similarly-sounding triphones, such as all PDFs associated with vowels or all PDFs associated with consonants. In general, components of a collection should be of closely-related phonemes, and each collection should have a minimum number of components. For example, in one implementation, when an acoustic model includes 24 features, each collection is required to include at least 96 components. It also may be desirable for collections to represent similar amounts of speaker data.

Another approach to generating collections is to group PDFs having mean vectors $\mu_k$ 430 that have similar values. This approach permits simplified, automatic generation of large numbers of collections. In general, implementations may include from one to several hundred collections of PDFs. Initial experimental results indicate that the first approach provides better results (i.e, results with lower recognition error rates).

As mentioned above, collections may be generated by a human operator or may be generated automatically. A hybrid approach also may be used. With such an approach, a human operator may generally classify different phonemes as being related and an automatic procedure then may be used to generate the collections. The automatic procedure may penalize collections that include components designated by the human operator as being unrelated. In another implementation, the automatic procedure may cluster only PDFs that correspond to phonemes designated by the human operator as being related.

Next, for each collection, all speaker data for the PDFs included in the collection are assembled (step 515). The speaker data may be supervised training data or unsupervised training data. Unsupervised training data may be produced as the speaker uses the speech recognition system. Supervised training data may be produced, for example, by prompting the speaker to say certain words, having the speaker read from a script, or using a human transcriber to verify the accuracy of results produced by the speech recognition system.

Next, y[j], the average value of the speaker data vector, is determined for each PDF j (step 520). If f[n] is the vector for the n-th frame of speaker data, $p_j(n)$ is the probability that the n-th frame of speaker data corresponds to a PDF j, and N is the total number of frames of speaker data, then y[j] and the frame count, N[j], for the frame j may be determined as: This technique for generating y[j] and N[j] usually is referred to as the Baum-Welch or EM algorithm.

Next, transforms ($A_c$ and $b_c$) are produced for each collection C using the relationship between the average values of the speaker data and the PDFs from the $$y[j] = \left( \sum_{n=1}^{N} p_j(n) \right)^{-1} \sum_{n=1}^{N} p_j(n) f[n],$$

$$N[j] = \sum_{n=1}^{N} p_j(n).$$

speaker-independent model 245 (step 525). This relationship may be expressed generally as:

$$y[j] = A_c x[j] + b_c + e[j].$$

where x[j] corresponds to the mean vector $\mu_j$ for a PDF j and e[j] is an error term.

In general, the error term includes a term corresponding to sampling error in y[j] and an additional term corresponding to modeling error, which may be significant for large data records. The sampling error term has a variance that is inversely proportional to N[j]. As such, the this portion of the error term may be reduced to zero as N[j] increases. The error term may be modeled as:

$$e[j] \sim N(O, Io^2/N[j]),$$

where N(m, C) indicates a Gaussian distribution with mean vector m and covariance matrix C, O is a vector of all zeros, I is an identity matrix, and $o^2$ corresponds to error variance.

Based on this formulation, maximum likelihood estimates (MLEs) are derived for the transformation parameters ($A_c$, $b_c$) under different constraints, such as $b_c$ equals zero, and $A_c$ is block-diagonal, banded, tri-diagonal, or diagonal. The solutions for the MLEs involve solving a set of linear equations. For example, in the unconstrained case, the MLEs are given by:

$$[A_c \, b_c]^T = \left(\sum_{j=1}^{N_C} N(j) x^+[j] x^{+T}[j]\right)^{-1} \sum_{j=1}^{N_C} N(j) x^+[j] y^T[j],$$

where $[A_c \, b_c]^T$ is the transpose of the matrix formed by inserting $b_c$ as an additional column of $A_c$, $x^+[j]$ is the column concatenation of x[j] and 1, $x^{+T}[j]$ is the transpose of $x^+[j]$, $y^T[j]$ is the transpose of y[j], and $N_C$ is the number of components in the collection C. The transformation ($A_c$, $b_c$) then is determined by transposing $[A_c \, b_c]^T$.

Using the transformations, adapted mean vectors $\mu_{jA}$ 440 are determined for each component in the collection C (step 530). In particular, the adapted mean vectors are determined as:

$$\mu_{jA} = A_c \mu_j + b_c.$$

The adapted mean vectors $\mu_{jA}$ 440 then are stored along with a speaker-identifier 445 as a speaker-adapted model 240 for later use in recognizing speech by the associated speaker (step 535). This process may be iterated several times by using the adapted models to update the frame counts N[j], the speaker average y[j], and the transform matrix.

In another implementation, fractions of the speaker independent means (x[j]) and the speaker-specific means may be used to compute y[j] and N[j]:

$$y[j] = \left(r + \sum_{n=1}^{N} p_j(n)\right)^{-1} \left(\sum_{n=1}^{N} p_j(n) f[n] + r x[j]\right)$$

$$N[j] = r + \sum_{n=1}^{N} p_j(n)$$

where r is a smoothing parameter that controls the relative importance of the speaker-independent means and the observed data. The value of r is optimized as a function of the amount of the adaptation data available. In one implementation, the value of r starts at two when no adaptation data is available and is decreased to 0.25 as the amount of adaptation data increases.

Figure 6:
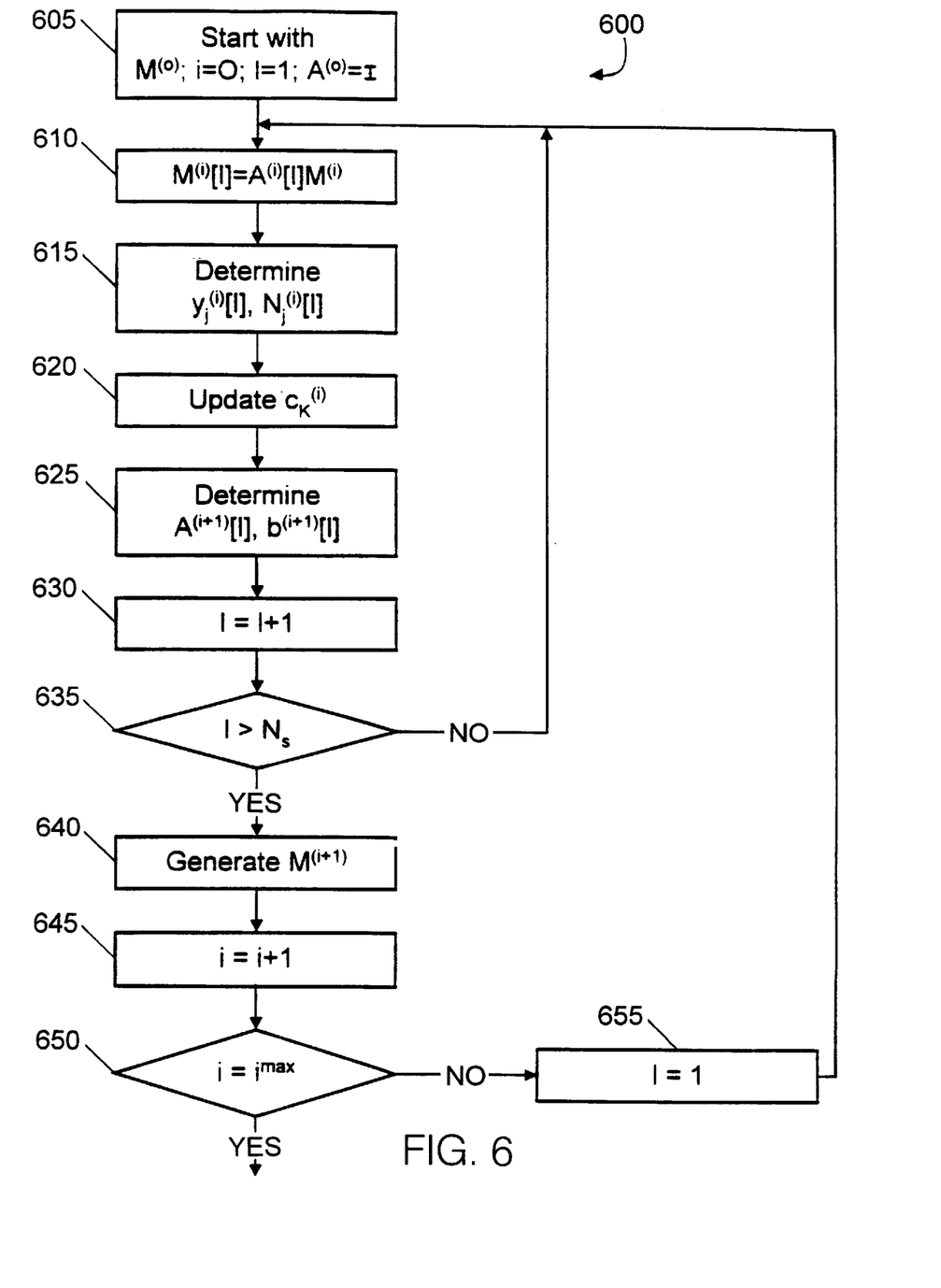

As shown in FIG. 6, a procedure 600 may also be used to retrain the speaker-independent model in the same way as the speaker-adapted models are created. The procedure starts with a baseline speaker-independent model $M^{(i)}$; i, an iteration count that is initialized to zero; and l, a speaker count that is initialized to one (step 605). A speaker-adapted model $M^{(i)}[l]$ then is generated for the speaker l by multiplying the mean vectors of the speaker-independent model by the transforms for the speaker l (i.e., $M^{(i)}[l]$ equals $A^{(i)}[l]M^{(i)} + b^{(i)}[l]$) (step 610). For the initial iteration each transform is an identity matrix.

Next, the Baum-Welch/EM algorithm is run using the speaker data to determine the mean speaker values ($y_j^{(i)}[l]$) and the frame counts ($N_j^{(i)}[l]$) (step 615) for all mixture components as:

$$y_j^{(i)}[l] = \left(\sum_{n=1}^{N_l} p_{jl}(n)\right)^{-1} \sum_{n=1}^{N_l} p_{jl}(n) f_l[n], \text{ and}$$

$$N_j^{(i)}[l] = \sum_{n=1}^{N_l} p_{jl}(n),$$

where $f_l[n]$ is the vector for the n-th frame of speaker data for the speaker l, $p_{jl}(n)$ is the probability that the n-th frame of speaker data for the speaker l corresponds to a PDF j, and $N_l$ is the number of frames of speaker data for the speaker l. The covariance matrices $c_k$ also are updated based on the speaker data (step 620).

Next, the transforms ($A_c^{(i+1)}[l]$ and $b_c^{(i+1)}[l]$) are produced for the speaker l as discussed above with respect to step 525 of the procedure 500 (step 625). The transforms are produced using the speaker-independent model $M^{(i)}$ and the means $y_j^{(i)}[l]$.

After the transforms are produced, the speaker count is incremented (step 630) and a determination is made as to whether the speaker count exceeds $N_s$, the number of speakers (i.e., a determination is made as to whether transforms have been generated for all of the speakers) (step 635). If data for additional speakers need to be considered (i.e., $l <= N_s$), then the procedure is repeated starting at step 610 for the new speaker designated by the incremented speaker count.

After transforms are generated for all speakers, an updated speaker-independent model $M^{(i+1)}$ is produced (step 640). Model means $x_j^{(i+1)}$ (also referred to as $\mu_j^{(i+1)}$) for the updated model may be determined as:

$$x_j^{(i+1)} = \left(\sum_{l=1}^{N_S} N_j^{(i)}[l] A^{T(i)}[l] A^{(i)}[l]\right)^{-1} \sum_{l=1}^{N_S} N_j^{(i)}[l] A^{T(i)}[l] y_j^{(i)}[l].$$

Model variances and mixture weights then are updated using standard techniques. Such techniques are described, for example, by Robert Roth et al., *Dragon Systems* 1994 *Large Vocabulary Continuous Speech Recognizer*, Proceedings of the Spoken Language Systems Technology Workshop, Jan. 22–25, 1995, pages 116–120, which is incorporated by reference. Alternatively, the model means $x_j^{(i+1)}$ for the updated model may be determined as:

$$x_j^{(i+1)} = \left(\sum_{l=1}^{N_S} N_j^{(i)}[l]\right)^{-1} \sum_{l=1}^{N_S} N_j^{(i)}[l] A^{(i)-1}[l] y_j^{(i)}[l],$$

which corresponds to applying the inverse transformation to each training speaker's mean and then applying the standard re-estimation technique.

Next, the iteration count is incremented (step 645) and a determination is made as to whether the iteration count equals $i_{max}$, which corresponds to the number of iterations to be performed (step 650). In one implementation, $i_{max}$ equals three so that three iterations are performed. If the iteration count equals $i_{max}$, then the procedure is complete. If the iteration count is less than $i_{max}$, then the speaker count is reset to one (step 655) and the procedure is repeated starting at step 610.

Figure 7:
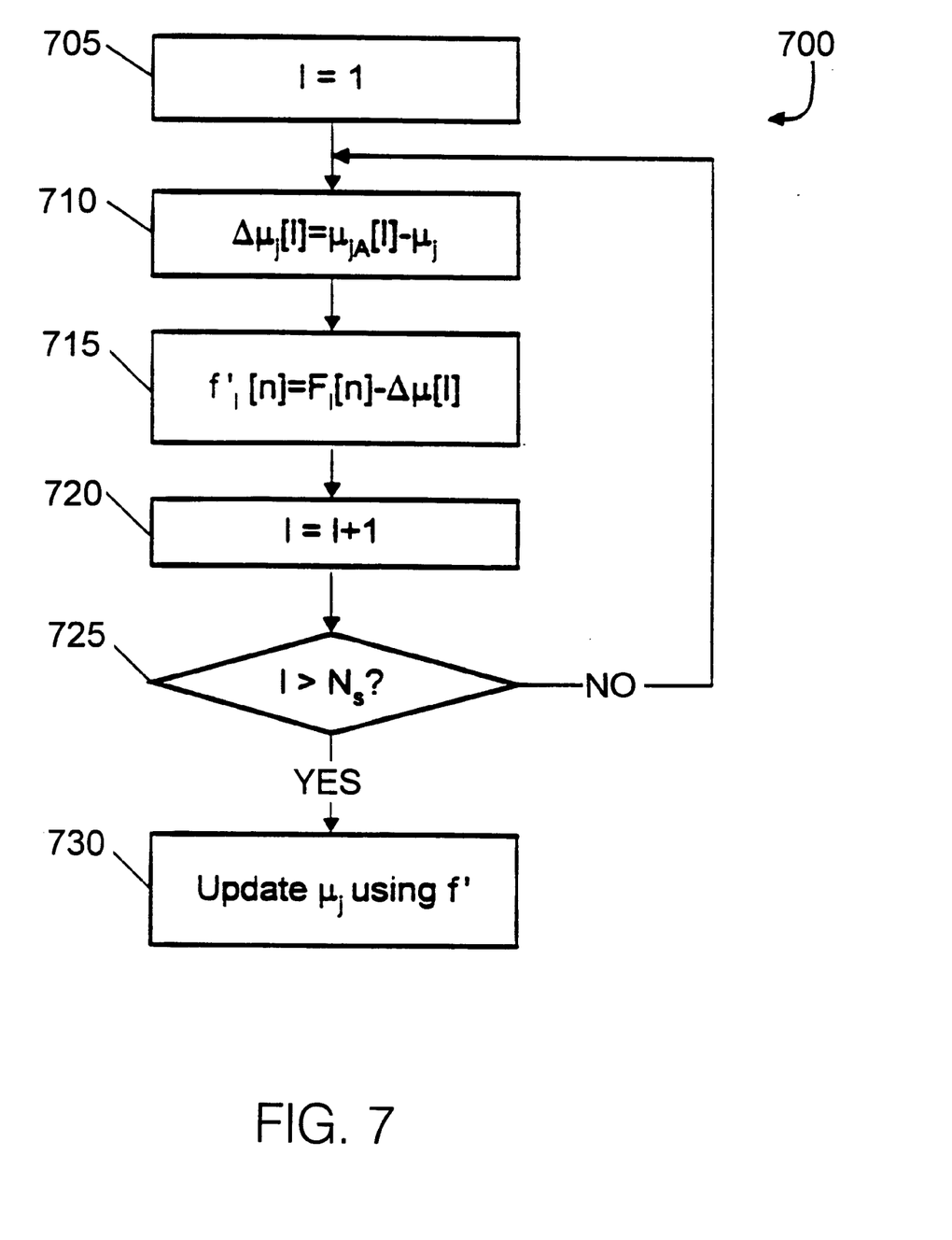

FIG. 7 illustrates an alternative procedure 700 for creating speaker-independent models. According to the procedure 700, the training data from the different speakers are modified to account for speaker variations prior to updating the speaker-independent model. The procedure starts with l, the speaker count, initialized to one (step 705). Using the current speaker independent models and frames of training data $\{f_l[n]\}$, transformation parameters $\{A_c, b_c\}$ are produced for each speaker l. Next, for each mixture component j, the difference $\Delta\mu_j[l]$ between the speaker-adapted mean value $\mu_{jA}[l]$ and the mean value $\mu_j$ (i.e., $x_j$) from a baseline speaker-independent is determined as (step 710):

$$\Delta\mu_j[l]=\mu_{jA}[l]-\mu_j=(A_c[l]-I)\mu_j+b_c.$$

Adjusted speaker data $f^*_l[n]$ then is produced by subtracting $\Delta\mu_j[l]$ from each frame $f_l[n]$ of speaker data in a probabilistic way as (step 715):

$$f_l^*(n) = f_l(n) - \sum_{j=1}^{J} p_{jl}(n)\Delta\mu_j[l],$$

where $p_{jl}[n]$ is the probability that frame $f_l[n]$ came from mixture component j, and J is the total number of mixture components.

Next, the speaker count is incremented (step 720) and a determination is made as to whether the speaker count exceeds $N_s$, the number of speakers (step 725). If data for additional speakers needs to be considered (i.e., $l<=N_s$), then the procedure is repeated starting at step 710 for the new speaker designated by the incremented speaker count.

After the data for all of the training speakers has been adjusted, the speaker independent model is updated using the adjusted training speaker data ($f^*_l[n]$) (step 730). The overall procedure may be iterated by recomputing the speaker transformations and updating the values for $\Delta\mu_j$, the adjusted training data, and, finally, the speaker independent models.

The same approach may be used to adjust speech data prior to performing recognition using the data. In particular, as described above, frames of speech data $f_{sl}[n]$ from a speaker l may be adjusted based on variations for that speaker to produce adjusted frames of speech data $f^*_{sl}[n]$:

$$f^*_{sl}[n]=f_{sl}[n]-\Delta\mu[l].$$

where $\Delta\mu[l][n]$ is a weighted average of $\Delta\mu_j[l]$ for all mixture components j. The adjusted frames of speech data then may be evaluated against a speaker-independent model to achieve some of the effects of using a speaker-adapted model without actually using a speaker-adapted model.

Other embodiments are within the scope of the following claims.

What is claimed is:

1. A method of generating a source-adapted model for use in speech recognition, the method comprising:
    generating a collection of elements from an initial model;
    assembling source speech data that corresponds to elements in the collection of elements from a set of source speech data for a particular source associated with the source-adapted model;
    generating statistics from the assembled source speech data;
    modifying the statistics using an element of the initial model and a smoothing factor that accounts for the relative importance of the element of the initial model and the assembled source speech data;
    using the modified statistics in determining a transform that maps between the assembled source speech data and the collection of elements of the initial model; and
    producing elements of the source-adapted model from corresponding elements of the initial model by applying the transform to the elements of the initial model;
    wherein determining the transform comprises determining a relationship between each element of the initial model in the collection and a portion of the assembled source speech data that corresponds to that element.

2. The method of claim 1, wherein generating the collection comprises generating a collection of elements associated with similarly-sounding speech units.

3. The method of claim 1, wherein generating the collection comprises generating a collection of elements having similar values.

4. The method of claim 1, wherein generating the collection comprises generating a collection of elements associated with similarly-sounding speech units and having similar values.

5. The method of claim 4, wherein a human operator identifies classes of elements having similarly-sounding speech units and generating the collection comprises using an automatic procedure that employs the identified classes and similarities between elements.

6. The method of claim 1, wherein the statistics comprise an average value of the assembled source speech data for a particular element.

7. The method of claim 6, wherein the statistics comprise a count of speech frames associated with the assembled source speech data for the particular element.

8. The method of claim 1, wherein the smoothing factor accounts for an amount of source speech data available for a particular element.

9. The method of claim 8, wherein the statistics comprise an average value of the assembled source speech data for a particular element, the average value being modified based on the smoothing factor and a value for the element from the initial model.

10. The method of claim 1, wherein:
    each element of the initial model includes a mean portion and a variance portion, and
    producing an element of the source-adapted model from a corresponding element of the initial model comprises applying the transform to the mean portion of the element of the initial model and leaving the variance portion unchanged.

11. A method of generating a source-adapted model for use in speech recognition, the method comprising:
    generating a collection of elements from an initial model;
    assembling speech data that corresponds to elements in the collection of elements from a set of speech data for a particular source associated with the source-adapted model;
    generating statistics from the assembled source speech data;
    modifying the statistics using an element of the initial model and a smoothing factor that accounts for an amount of source speech data available for a particular element;

determining a transform that maps between the assembled speech data and the collection of elements of the initial model using the modified statistics; and producing elements of the source-adapted model from corresponding elements of the initial model by applying the transform to the elements of the initial model.

12. The method of claim 11, wherein the statistics comprise an average value of the assembled source speech data for a particular element, the average value being modified based on the smoothing factor and a value for the element from the initial model.

13. A method of generating a source-adapted model for use in speech recognition, the method comprising:

generating a collection of elements from the initial model;

assembling speech data that corresponds to elements in the collection of elements from a set of speech data for a particular source associated with the source-adapted model;

generating statistics from the assembled source speech data;

modifying the statistics using an element of the initial model and a smoothing factor that controls the relative importance of the element of the initial model and the assembled source speech data;

using the modified statistics in determining a transform that maps between the assembled speech data and the collection of elements of the initial model; and producing elements of the source-adapted model from corresponding elements of the initial model by applying the transform to the elements of the initial model;

wherein a human operator identifies classes of related elements and the collection of elements is generated using an automatic procedure that favors including elements from a common class in the collection and penalizes including elements from different classes in the collection.

14. A method of training a speech model for use in speech recognition, the method comprising:

assembling sets of speech data that correspond to elements of an initial model from a set of speech data for one or more sources, the assembled speech data including multiple items;

calculating representative values for each set of speech data;

modifying a representative value for a set of speech data using a corresponding element of the initial model and a smoothing factor that controls the relative importance of the corresponding element of the initial model and the set of speech data;

determining a relationship between the representative values for each set of speech data and values of the corresponding element of the initial model, where a relationship for a first set of speech data differs from a relationship for a second set of speech data;

modifying each item of the sets of speech data using the relationship for the set to which the item belongs; and generating elements of the speech model using the modified sets of speech data.

15. The method of claim 14, wherein the initial model has a structure that differs from a structure of the speech model.

16. The method of claim 14, wherein the initial model comprises a first number of elements and the speech model comprises a second number of elements, the first number being substantially larger than the second number.

17. The method of claim 14, wherein the source comprises a particular speaker.

18. The method of claim 14, wherein:

assembling sets of speech data that correspond to elements of an initial model comprises assembling different sets for speech data from different sources;

a relationship for a first set of speech data for a first source differs from a relationship for a second set of speech data for the first source and from a relationship for a third set of speech data for a second source; and generating an element of the speech model comprises using modified sets of speech data from different sources.

19. The method of claim 14, wherein the relationship for a first set of speech data comprises a linear transformation.

20. The method of claim 14, wherein:

determining a relationship comprises determining a transform that maps between the set of speech data and the element of the initial model, and generating an inverse of the transform; and modifying each element of a set of speech data comprises applying the inverse of the transform to each element of the set of speech data.

21. A method of training a speech model for use in speech recognition, the method comprising:

assembling speech data that corresponds to a first element of the speech model from a set of speech data for a first source;

determining a transform that maps between the assembled speech data and the first element of the speech model;

generating an inverse of the transform;

modifying the assembled speech data using the inverse of the transform; and updating the first element of the speech model using the modified assembled speech data, wherein determining the transform comprises modifying the transform using the first element of the speech model and a smoothing factor that controls the relative importance of the first element of the speech model and the assembled speech data.

22. The method of claim 21, further comprising:

from a set of speech data for a second source, assembling speech data that corresponds to the first element of the speech model;

determining a second transform that maps between the assembled speech data for the second source and the first element of the speech model; and generating an inverse of the second transform;

wherein the step of updating comprises updating the first element of the speech model using the assembled speech data for the first and second sources and the inverses of the first and second transforms.

23. The method of claim 1, wherein the transform comprises a linear transform.

24. The method of claim 11, wherein the transform comprises a linear transform.

25. The method of claim 13, wherein the transform comprises a linear transform.

* * * * *